(12) United States Patent
Henry (10) Patent No.: US 9,834,151 B2
(45) Date of Patent: Dec. 5, 2017

(54) VEHICLE MOUNTED SECURING SYSTEM

(71) Applicant: DSH Designs, LLC, Hayden, ID (US)

(72) Inventor: D. Sean Henry, Hayden, ID (US)

(73) Assignee: DSH Designs, LLC, Hayden, ID (US)

( * ) Notice: Subject to any disclaimer, the term of this patent is extended or adjusted under 35 U.S.C. 154(b) by 223 days.

(21) Appl. No.: 14/668,992

(22) Filed: Mar. 26, 2015

(65) Prior Publication Data

US 2016/0280147 A1    Sep. 29, 2016

(51) Int. Cl.
*B60R 9/00* (2006.01)
*B60R 9/048* (2006.01)

(52) U.S. Cl.
CPC ............... *B60R 9/048* (2013.01); *B60R 9/00* (2013.01)

(58) Field of Classification Search
CPC ..... B60R 2011/0078; B60R 2011/0066; B60R 2011/0052; B60R 2011/00; B60R 9/00
USPC ......... 224/42.4; 248/220.31, 220.22, 225.11, 248/233.41, 224.8, 229.1, 689–690, 248/222.14; 211/175; 411/191, 166, 169
See application file for complete search history.

(56) References Cited

U.S. PATENT DOCUMENTS

| | | | | |
|---|---|---|---|---|
| 3,557,857 | A * | 1/1971 | Swenson | F16B 37/045 411/274 |
| 5,113,791 | A * | 5/1992 | Rottschafer | B63H 20/36 114/362 |
| 6,457,618 | B1 * | 10/2002 | Hancock | B60R 7/14 224/319 |
| 6,769,847 | B1 * | 8/2004 | Heilmann | B60P 7/0807 410/101 |
| 9,103,365 | B2 * | 8/2015 | Whipple | F16B 37/00 |
| 2006/0243770 | A1 * | 11/2006 | Kortbein | B60R 7/14 224/547 |
| 2009/0014602 | A1 * | 1/2009 | Frost | B60R 7/08 248/100 |
| 2013/0146724 | A1 * | 6/2013 | Werthauser | B60R 11/00 248/205.1 |
| 2015/0191929 | A1 * | 7/2015 | Takahashi | E02D 27/42 52/295 |

* cited by examiner

*Primary Examiner* — Justin Larson
*Assistant Examiner* — Phillip Schmidt
(74) *Attorney, Agent, or Firm* — John Chandler (57) ABSTRACT

A vehicle mounted securing system is described. A rack is secured to the vehicle. Oblong slots formed in the rack provide a variety of locations at which to secure items to the racks. Brackets, strap mounts and the like are easily and removably attached to the rack by specially shaped disks or pucks which fit within the contours of a slot. Items may be secured by one or more bracket-puck combinations inside or outside of the vehicle.

19 Claims, 7 Drawing Sheets

VEHICLE MOUNTED SECURING SYSTEM

BACKGROUND

Field

The present invention relates generally to systems and devices with which to affix items to vehicles, and more particularly, to a system of panels and pucks used in conjunction with brackets to facilitate removably securing items to vehicles and thereby preventing movement, loss and damage to items while in transit.

Related Art

Transportation is a universal essential for society. Motorized vehicles carry people and things to and from various places. Vehicle manufacturers have provided various compartments and storage facilities in which to stow certain items. However, as a casual inspection of vehicles in common use would confirm, items in personal use vehicles and recreational vehicles often lie loose in trunks and cabins, on and under seats, on dashboards, on rear window ledges and so forth. As is commonly known, items tend to roll and bounce around during transport. This phenomenon is especially acute in recreational vehicles such as trucks and sport utility vehicles which do not have finely tuned suspensions and occasionally travel over unpaved and rough roads. Loose or unstowed items are susceptible to damage and loss.

Further, there is an abundance of open-type vehicles with open compartments that cannot be easily secured against theft of transported cargo. Such open-type vehicles include, among others, trucks having open beds, sport utility vehicles such as Jeep-brand vehicles having a removable or canvas top, convertibles having a removable hard top, and half-truck/half-car (coupe utility) style vehicles having open beds or compartments. What has not been available is a system to substantially enclose a compartment or cabin, and provide a device to facilitate securing of items within the space.

Over the years, commercial vehicle manufacturers have built various open and closed compartments into the interior of vehicles. However, these features suffer from many drawbacks. For example, if an item does not fit neatly into one of the rigid compartments, the item is often thrown loose into a trunk, under a seat or in a pocket behind a seat in the cabin of the vehicle. Freely movable items can present a danger to a passenger or driver during operation of the vehicle or during a collision. Even if an item fits within a compartment, the item is often unsecured therein and rattles around inside. Noises can cause irritation and distractions for vehicle operators. Further, when items are stowed inside compartments, it is not easy to inventory supplies for a trip or outing.

The after-market automotive product industry has offered a broad range of products for use with automobiles, pick-up trucks and other types of vehicles. In particular, some of these products work with truck beds to organize and secure loads relative to the truck bed or side wall. Known products have several limitations. For example, one limitation is that known organizers are bulky and fill a significant amount of space within or above a truck bed, on top of a vehicle or within the confines of a vehicle cabin even when not hauling cargo. Another limitation of known organizers is that they are difficult to install and time-consuming to adjust and use.

Loads commonly shift during transportation. Shifting can cause securing mechanisms (e.g., straps, elastic tie-downs) to become loose and ineffective. Use of straps and the like are time consuming to install and requires a user to anticipate how a load could shift during transportation. Accordingly, another limitation is the time consuming nature of known after-market straps and tie-downs. Another limitation is that they can only be secured to a few available locations within or outside of a vehicle. For example, in the bed of a truck, there are only a few loops or places that can accept a hook, rope or tie-down. Similarly, there are only a limited number of loops, lips, rolled edges, and the like within a cabin of cars, vans, sport utility vehicles and recreational vehicles to secure large items. Further, there are only a limited number of places and types of compartments, slots and so forth in which to store personal items in cars, vans, sport utility vehicles and recreational vehicles. Accordingly, there is an opportunity to improve upon attachment and safe storage devices and systems for items large and small.

SUMMARY

Embodiments and techniques described herein relate to providing a system of panels and anchors or pucks for affixing brackets and the like for stowing and transporting items of all sizes either within or outside of vehicles.

One objective is to provide a system of panels with slots that coordinate integrally with pucks and securing brackets for placement of securing means for items to the panels.

Another objective is to provide a substantial and rigid panel system that can securely enclose open compartments of certain vehicles.

Another objective is to provide a panel system that is independent of manufacturing differences from model to model and from manufacturer to manufacturer; that is, to provide a variety of panels that can be selected and installed on a variety of vehicles.

Another objective is to provide a system of racks and components that may be used and adjusted to fit a wide variety of items with the use of just a few tools.

Another objective is to provide a system that can be used with a variety of clamps and other securing components so as to accommodate a wide variety of items and a wide variety of customization by end users.

Another objective is to provide a system that allows for a continuous range of locations along slots for placing items in and on a vehicle.

Another objective is to provide a system that secures items to vehicles that are designed to travel over rough roads and off road without dislodging or harming secured items.

This summary is provided to introduce a selection of concepts in a simplified form that are further described below in the detailed description. This summary is not intended to identify key or essential features of the claimed subject matter, and thus is not intended to be used to limit the scope of the claimed subject matter.

BRIEF DESCRIPTION OF THE DRAWINGS

While the appended claims set forth the features of the invention with particularity, the invention, together with its objects and advantages, is more readily appreciated from the following detailed description, taken in conjunction with the accompanying drawings. Throughout, like numerals generally refer to like parts. Unless specifically indicated, the components and drawings are not shown to scale.

GLOSSARY 1 panel
2 slot
3 attachment bracket
4 straight edge of panel
5 door
6 window
7 hood (top surface)
8 roll bar
9 contoured edge of panel
10 vehicle
11 front of vehicle
12 puck
13 passage through puck
14 connection axis
15 bracket
16 bracket arm
17 bracket aperture
18 bracket body
19 bolt
20 bolt head
21 threaded end of bolt
22 width of panel slot
23 flat edge of panel
24 thickness of panel at place of slot
25 length of a first set of slots
26 length of a second set of slots
27 logo
28 lightweight item
30 working or inner surface of slot
31 washer
32 tooth of puck
33 threads of puck passage
34 outer surface of puck
35 top surface of puck
36 vertical surface of tooth
37 width of tooth
38 shoulder thickness or height
39 base shoulder height
40 cutout height
41 tooth height
42 shoulder surface
43 shoulder gripping surface
44 puck width
45 puck bottom surface
46 bracket hook
47 bracket base
48 flexible belt
49 heavy item
50 alternative shaped puck
51 heavy bracket

DETAILED DESCRIPTION

Overview

The instant invention solves many of the shortcomings securing mechanisms and systems for vehicles. The described systems and components are particularly useful for open-type vehicles including trucks with open beds, sport utility vehicles such as Jeep-brand vehicles having a removable or canvas top, convertibles having a removable hard top, and half-truck/half-car (coupe utility) style vehicles having open beds or compartments. The instant invention can also be modified to be installed on a workbench, closet or garage for securing objects.

Figure 1:
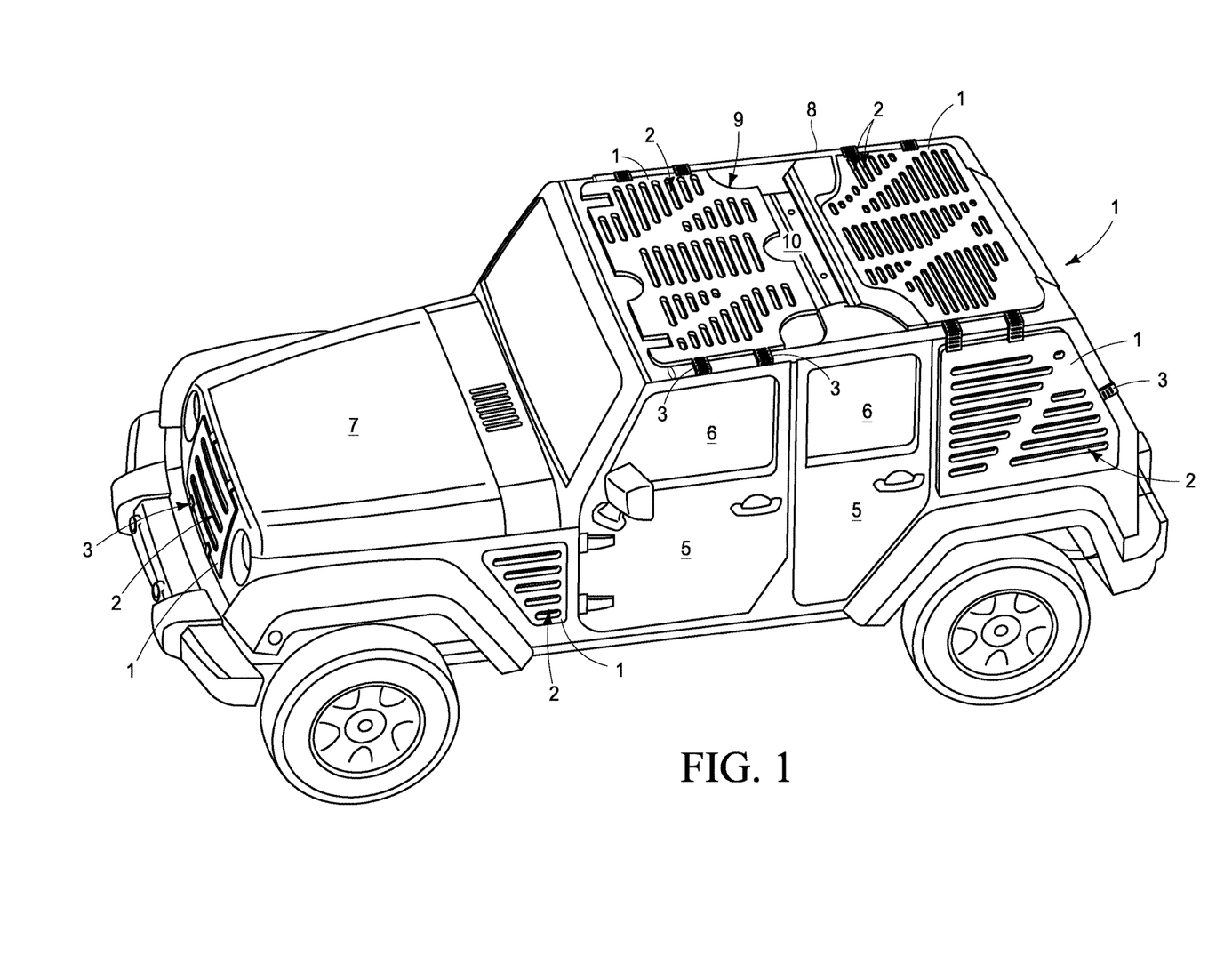
FIG. 1 is an overhead perspective view of a vehicle to which is mounted several panels of various sizes and shapes according to a first illustrated embodiment.

FIG. 1 is an overhead perspective view of a vehicle to which is mounted several panels of various sizes and shapes according to a first illustrated embodiment. With reference to FIG. 1, one or more panels 1 are affixed to the vehicle 10. Each panel 1 includes one or more slots 2. The slots 2 are shown as of uniform width, the length of each slot 3 being variable depending on size of a flat portion of the respective panel 1. The slots 2 are shown as generally horizontal in orientation. Slots may be oriented substantially horizontally, substantially vertically, or at an angle relative to the horizon. Preferably, the slots 2 are oriented substantially horizontally so as to reduce the chance for brackets 3 to loosen and move over time. Horizontal slots 2 generally provide a continuous range of locations at which to mount items (not shown) as described in more detail below. Each of the panels 1 is attached by one or more brackets 3. Preferably, the brackets 3 hold the panels 1 to a structural feature of the vehicle 10 such as a roll bar 8, frame, bracket or other rigid feature depending on the make and type of vehicle 10. The panels 1 may be affixed, installed or attached permanently, or may be installed for a season with the intention for the brackets 3 and panels 1 to be affixed for a relatively short duration of a few weeks or months per year. In either situation, the panels 1 and brackets 3 may be part of an after-market purchase and after-market installation. Alternatively, the panels 1 may be built into the frame or structure of the vehicle and thereby may be offered as an option by a manufacturer or dealer. A more weather-proof covering (not shown) may be installed over the vehicle 10 and specifically over the panels 1 and brackets 3 in case of cold, hot or otherwise inclement weather.

A generic open-type land-based vehicle is shown for sake of illustration only. The panels 1 may be affixed by brackets 3 or other means to any type of vehicle at any location on or in the vehicle. Generally, panels 1 may be installed on any type of vehicle such as trucks, boats, all-terrain vehicles (ATV's), and so forth—preferably to motorized vehicles. The panels 1 may be built with one or more straight edges 4 or may be provided with contoured edges 9 to accommodate doors 5, windows 6, hoods 7, and other features or components of the vehicle 10. As shown in FIG. 1, panels are affixed to left, right, back, top and front 11 sides of the vehicle 10.

Figure 2:
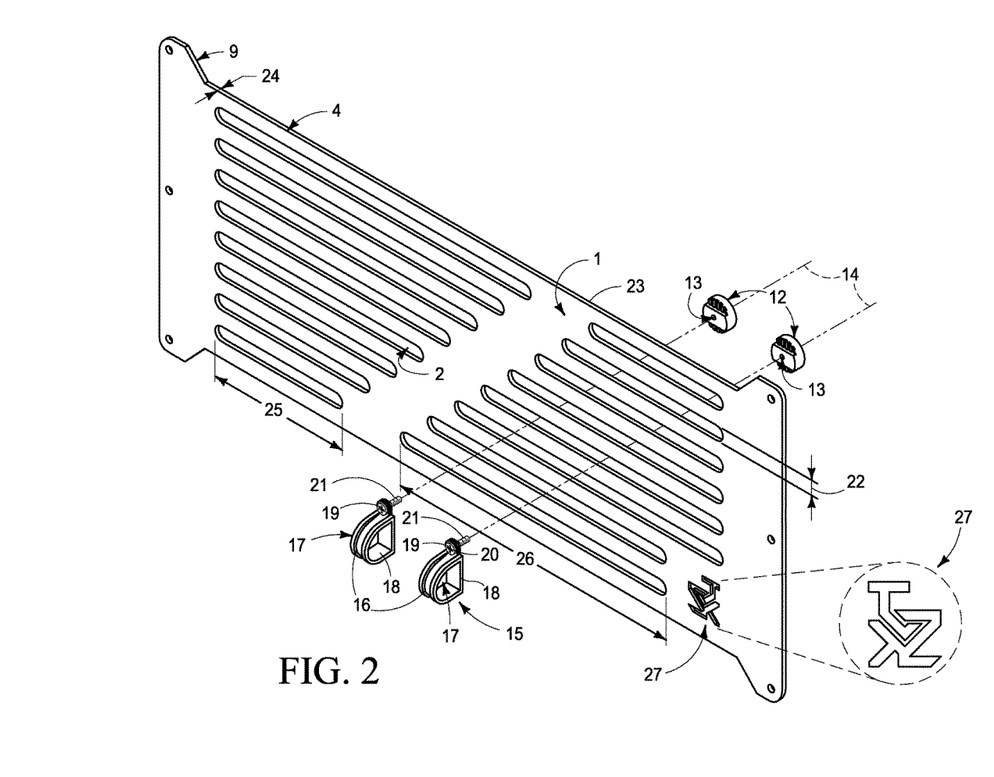
FIG. 2 is a front perspective exploded view of a rack or panel similar to the panels shown in FIG. 1 showing two mounts or brackets and two pucks for mounting an item to the rack.

FIG. 2 is a front perspective exploded view of a rack or panel 1 similar to one of the panels shown in FIG. 1. With reference to FIG. 2, the panel 1 is formed with a series of parallel slots 2 that extend generally horizontally across the panel 1. A first series of slots 2 is evident on the left side of the panel 1, the first series of slots 2 generally increasing in slot length 25 from small to large when going from bottom to top. A second series of slots 2 is evident on the right side of the panel 1, the second series of slots 2 generally decreasing in length 26 when going from bottom to top. Such arrangement of slots 2 into a first, second or other series of slots is substantially based on the geometry, size and shape of the respective panel 1—including the spacing between adjacent slots 2—as long as sufficient structural integrity is maintained. Spacings between pairs of series of slots may be selected based on geometry (e.g., size, shape) of each panel 1, or may be done to conform with an aesthetic appeal of the panel 1 when installed on a vehicle. That is, as long as the thickness 24 of the panel 1 and the material of the panel 1 lend sufficient strength so as to accommodate typical loads of items on the panel 1, this is acceptable. In the implementation shown, the width 22 of each oblong- or stadium-shaped slot 2 is approximately one inch (2.54 cm). The length of each slot 2 varies.

The panel 1 may include aesthetic features such as a logo 27, and surfaces which are polished, coated, anodized, or treated or colored with a powder coating. Panels 1 may be made of any suitable material including a plastic material such as high-density polyethylene (HDPE), ultra-high-molecular-weight polyethylene (UHMWPE); a metal such as aluminum or alloy thereof, an iron based metal, a steel based metal; and a synthetic resin. The panel 1 may be made of a rigid or semi-rigid material. The panel 1 may also include contoured edges 9 and straight edges 4. The edges 4, 9 are shown as substantially flat edges 23. The inside surface of each slot 2 is preferably flat so as to accommodate pucks 12 from either a first (front) direction or a second (back) direction. The pucks 12 are shown in exploded view as being placed from a back direction along an assembly axis 14. A threading hole 13 or passage is evident in each puck 12. The first series of slots 2 and second series of slots 2 are shown as sets of substantially parallel slots 2. The parallel nature of the slots 2 in this illustration could be considered an aesthetic quality, but also serves to provide a continuous range of positions for placement of the pucks 12 over a substantial area of the panel 2 and is a structural feature to maximally accommodate multiple pucks 12 placeable over a continuous range of distances between successive pucks 12.

The pucks 12 are intended to be assembled to a bracket which is generally indicated as 15. While one specific type of bracket 15 is illustrated in FIG. 2, many different types of brackets may be used in conjunction with the panel 2. Preferably, the brackets 15 used with the panel 2 take advantage of the puck 12 so that the combination of puck 12 and bracket 15 stays securely in place during use. Each bracket 15 is generally composed of various structural components as is illustrated generically for convenience in FIG. 2. Certain of these components may be combined or formed into one or more composite parts. According to a first example and as illustrated in FIG. 2, a bracket 15 includes a generally flat or vertical portion such as a bracket body 18 that is designed to lay against the panel 1. The bracket body 18 may be made of any single or combination of suitable materials such as, but not limited to, a metal such as aluminum, iron and a steel, wood, and a plastic. The surface of the bracket body that lies against the panel 1 is preferably textured or coated, or the bracket 15 is formed of a material so as to encourage friction between the panel 1 and bracket body 18 so as to discourage gradual migration or walking of a bracket 15 along a slot 2 over time when the assembly is exposed to road vibration. The bracket 15 also includes a bracket arm 16 or binding portion that forms an inner surface or bracket aperture 17 for receiving and holding fixed to the panel 2 an item (shown in FIG. 3). The bracket body 18 and bracket arm 16 may be lined with a soft or pliable material such as a soft plastic, rubber material, fabric material and the like. Such pliable material provides for absorbing vibrations transferred to the panel 2, pucks 12 and brackets 15 during vehicle operation. The bracket body 18 preferably includes a passage or aperture that accommodates a bolt 19 through the geometric center of the puck 12. The passage may be reinforced, lined or strengthened so as to reduce or discourage wear of the puck 12. The bolt 19 includes, at a proximal side, a bracket head 20 for accepting a stand tool such as a flat screw driver, hex wrench, crescent wrench or the like. The distal end 21 is preferably threaded with male threads for threading into a threaded passage 13 of the respective puck 12.

Figure 3:
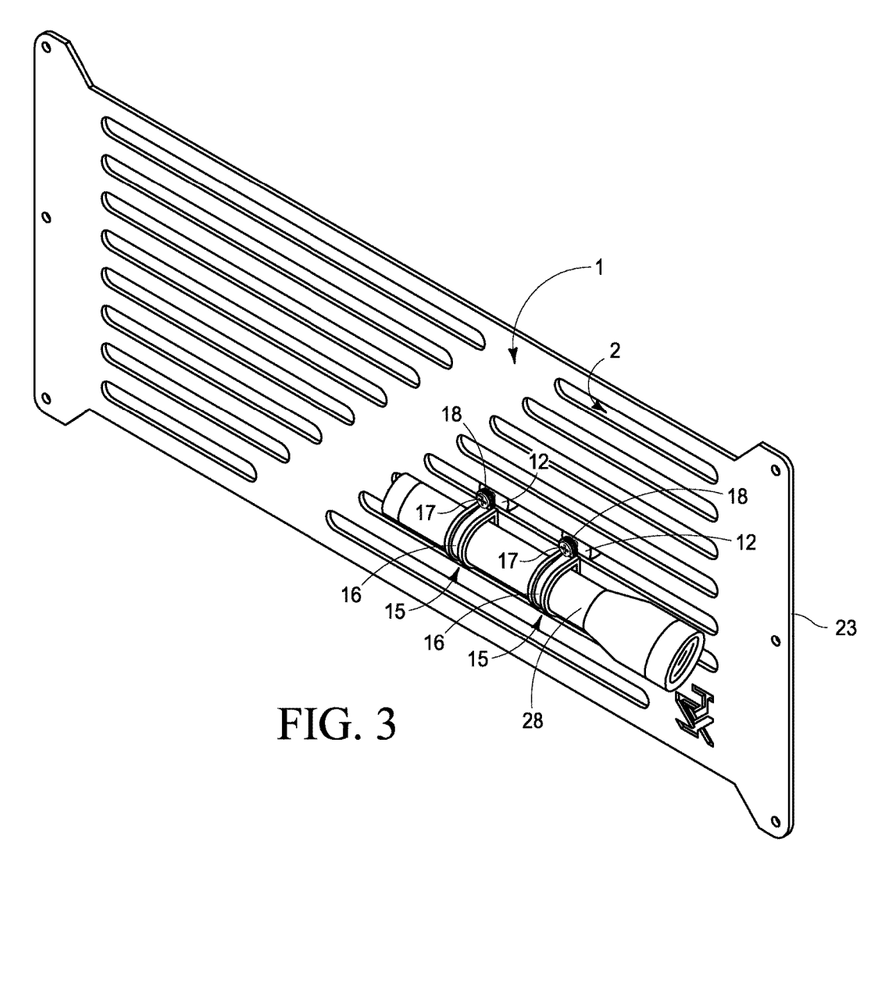
FIG. 3 is front perspective view similar to that shown in FIG. 2 with parts assembled and an item securely and removably attached to the rack.

FIG. 3 is front perspective view similar to that shown in FIG. 2 with parts assembled and an item securely and removably attached to the rack or panel 1. With reference to FIG. 3, a flashlight 28 is shown firmly affixed to the panel 1 by bracket arms 16. The flashlight 28 represents a generally lightweight item and symbolizes all lightweight or small items that could be attached to the panel 1. While two brackets 15 are illustrated, one or more brackets 15 per item 28 may be used. The number of brackets 15 used to secure the item 28 to the panel 1 depends on the desire of the user and depends on the characteristics, size, weight and orientation of the item 28 when secured to the panel 1 in view of the anticipated forces on the item 28. Bolt heads 17 are visible on the front side of the respective bracket bodies 18. The pucks 12, when properly connected to the brackets 15, prevent the flashlight 28 from moving relative to the panel 1. Because of the puck shape, each of the pucks 12 is snuggly fit into the slot 2; the pucks 12 prevent vertical movement relative to the panel 1. Tension or friction between the panel 1 and each puck 12 is maintained by tightening the threading of the bolts into the pucks 12 (and optionally one or more other parts such as a nut, threaded washer, clip) during assembly such that the pucks 12 and assembled brackets 15 are not free to slide horizontally within the slot 2.

While a flashlight 28 is shown in FIG. 3, the panel 1, pucks 12 and brackets 15 can safely and securely stow such things as jacks, spare tires, tools, toolboxes, flashlights, food containers, music playing equipment, guns, gun racks, luggage, skis, snowboards, bicycles, fire extinguishers and other small and large items. The items may be secured to either side of the panel 1. Since the items are off the floor of the vehicle and in a prominent location, i.e., not tucked in a vehicle or seat pocket, in a closed compartment or under a seat, passengers and drivers may quickly assess that the secured items are aboard and ready for travel.

Figure 4:
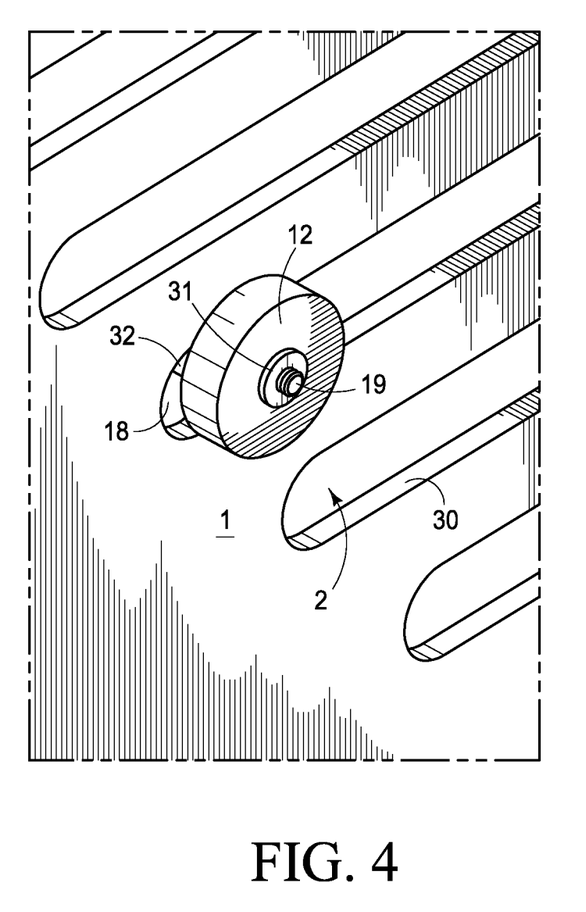
FIG. 4 is a close-up rear perspective view of a portion of a rack such as one of the panels shown in FIG. 1.

FIG. 4 is a close-up rear perspective view of a portion of a rack such as one of the panels shown in FIG. 1 or in FIGS. 2-3. With reference to FIG. 4, a panel 1 includes a series of slots 2 formed therein. According to a preferred implementation, the slots 2 are substantially oblong or stadium shaped, that is, shaped with a long, rectangular section in between two semi-circular cutouts in the panel 1. Alternatively, the ends of each slot 2 or channel could be square, tapered to a point, or take some other shape so long as the body of the slots 2 forms an oblong shape. In yet a further alternative, instead of slots 2, the panel 1 is formed with a series of circular cutouts that match the shape of the distal or tooth end 32 of the pucks 12. A user is then able to select an aperture for each puck 12 used to affix a bracket to the panel 1. While the edges of the puck 12 are shown as square, the edges of the puck 12 may be chamfered or rounded. For example, in order to decrease wear and to reduce the chance of improper assembly in a slot 2 with a bracket 15, a distal edge of the tooth 32 is chamfered.

Referring again to FIG. 4, each slot 2 is formed with a generally flat and smooth surface 30, referred also a working surface or inner surface of the slot 2. The surface 30 is shown as smooth, and is preferably smooth and polished in finish. However, the working surface 30 may be textured or roughened depending on the material with which the panel 1 is made. Each puck 12 is contoured or shaped with a protuberance or tooth 32 that matches the shape of the slot 2—whether placed at an extreme end of the slot 2 or anywhere along the length of the slot 2. The distal end of the bolt 19 is visible protruding through the puck 12. A threaded washer 31 secures the distal end of the bolt at the back side of the puck 12. Alternatively, a combination of bolt and puck 12 is susceptible to assembly without tools based on rotation of the threaded washer 31 relative to the bracket 15. As can be seen in FIG. 4, if a bracket (visible as the bracket body 18) needs to be moved along the slot 2, the bolt 19 may be partially loosened from the puck 12 and washer 31, and the entire assembly including the puck 12 may be slid either left or right in the slot 12. Once a desired place is found, tightening the bolt 19 fixes the puck 12 and bracket body 18 to the panel 1 at the desired location.

Figure 5:
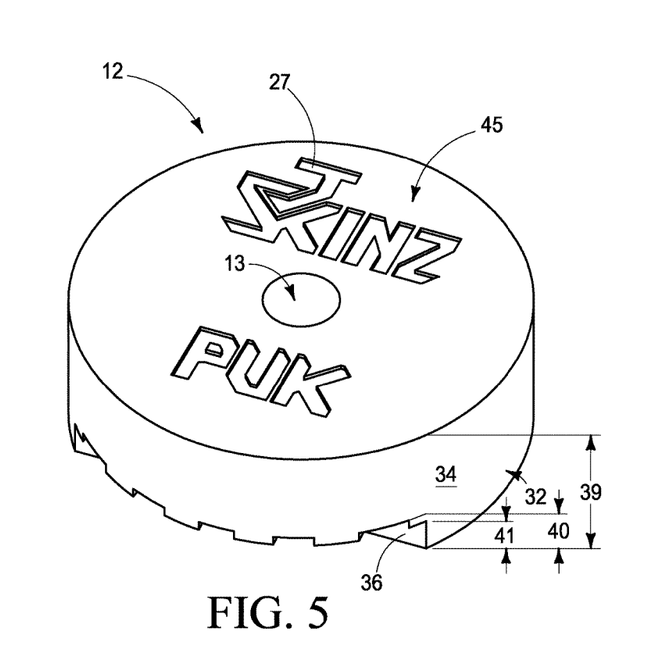
FIG. 5 is a top perspective view of a puck shown in FIGS. 2-4 according to a first illustrated embodiment.

FIG. 5 is a top perspective view of a puck 12 first shown in FIGS. 2-4 according to a first illustrated embodiment. With reference to FIG. 5, the puck 12 includes an outer surface 34. The puck 12 is shown as being formed of a same uniform material throughout and all over. Such may or may not be the case. The outer surface 34 may be treated or colored. A metal band may be attached at the outer surface 34, and so forth. A metal insert (not shown) may be formed, inserted into or assembled inside the passage 13 so as to provide increased strength to the threads 33. Preferably, the outer or circumferential surface 34 is smooth and the shape of the puck 12 is circular. Other shapes of puck 12 are possible (refer to FIGS. 7-8). For example, the outer profile shape of the puck 12 may be oval, square or rectangular and so forth as long as a puck width 44 is substantially greater than the slot width 22 so as to facilitate maintenance of the puck 12 in a stable position when installed in a panel 1. As shown in FIG. 5, the puck width 44 is a puck diameter. The raised tooth 32 of the puck 12 is designed to fit into a slot 2. That is, the tooth width 37 substantially matches the size or width of the slot 2 such that when the tooth 32 is engaged in a slot 2, there is no play when the puck 12 is placed within the slot 2. The slot surface 30 mates tightly with the vertical surface 36 of the tooth 32. For example, if a slot size 22 is one inch (2.54 cm), the tooth width 37 is slightly less than the slot size 22 so that the slot 2 and the puck 12 tightly mate together. In addition, if the tooth height 41 is sufficient, the top surface 35 may flushingly mate against the back of the bracket body 18 when assembled into a slot 2.

The top surface 35 may be modified to include a logo 27 or other markings such as branding, instructions, size indicator, and so forth. The modification will depend upon the material used to make the puck 12. If the puck 12 is made from a metal, an etching or engraving may be used to add markings. If the puck is cast in a mold (metal or plastic), then no further treatment may be needed to include the logo 27 or other markings. Preferably, a puck 12 is made from an HDPE or other synthetic material. Alternatively, pucks 12 may be made of a metal such as aluminum or a steel, or a combination of materials. If a puck 12 is made of a plastic or other synthetic material, a color or dye may be added to the material to indicate certain information such as a brand, size, weight limit and so forth. Different colors may correspond to different characteristics of a puck 12 such as slot width, tooth height, thread tightening limit, a safe weight limit for a particular color of puck, and so forth.

According to a preferred implementation, a set of pucks 12 are of a uniform size and shape so that only a single size of puck 12 is needed for all panels 1 and may be used for all types, shapes and sizes of brackets 15. This assumes that all slots 2 have a single slot width 22.

With reference to FIG. 5, there are two types of shoulder height for the puck 12. A first shoulder height 38 defines how deep the tooth 32 is inserted into the slot 2. The first shoulder height 38 corresponds to a first shoulder surface 43 that matingly grips or presses against the surface of the panel 1 when a puck 12 is assembled into a slot 2. A second shoulder height or base shoulder height 39 corresponds to a second shoulder surface 42. The shoulder heights 38, 39 correspond to a set of crenelated surfaces 42, 43 that together provide a gripping shoulder when a bolt (not shown) is threaded into the puck passage 13 and the puck 12 is assembled into a slot 2. As measured from the top surface 35, the distance to the second shoulder surface 42 is the cutout height 40.

Figure 6:
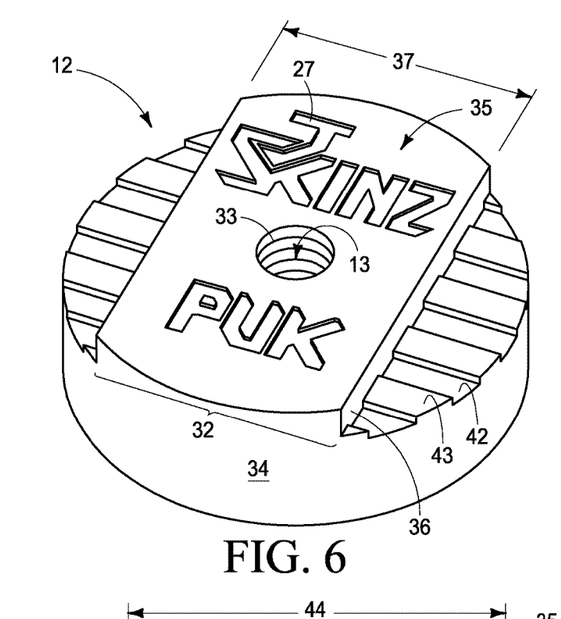
FIG. 6 is a bottom perspective view of the puck shown in FIG. 5.
Figure 6A:
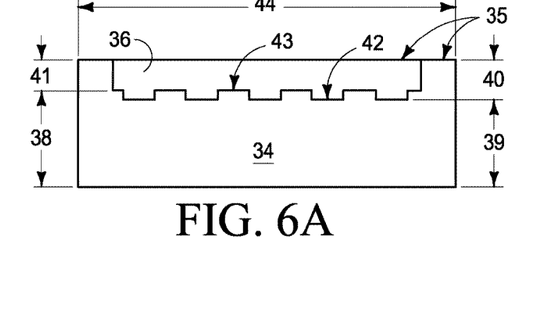

FIG. 6 is a bottom perspective view of the puck shown in FIG. 5. A bottom surface 45 of a puck 12 is visible. The bottom surface 45 may be modified to include a logo 27 or other markings such as branding, instructions, size indicator, and so forth. The vertical tooth surface 36 is visible as well as the puck outer surface 34. The tooth height 41 is indicated as the distance between a top surface of the tooth 32 and a first shoulder. A base shoulder height 39 is indicated, and the crenelated or slotted shoulders are visible.

Figure 7:
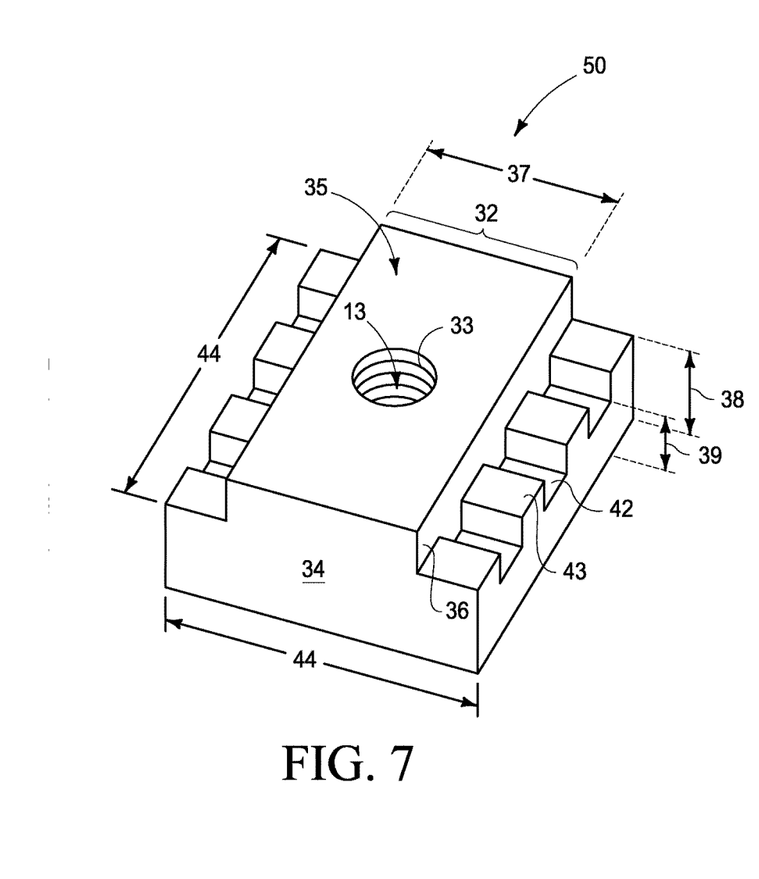
FIG. 7 is a top perspective view of a square-shaped puck according to a second illustrated embodiment.

FIG. 7 is a top perspective view of a square-shaped puck 50 according to a second illustrated embodiment. With reference to this FIG. 7, a puck 50 has substantially square dimensions in that a width and height 44 are the same as measured at the outer bounds of the shoulder. A passage 13 and threads 33 are visible. A first shoulder height 38 corresponds to a first shoulder surface 43 that matingly grips or presses against the surface of the panel 1 when the puck 50 is assembled into a slot 2. A base shoulder height 39 corresponds to a second shoulder surface 42. The alternating crenelated surfaces 42, 43 are visible. The vertical tooth wall 36 also is visible. The tooth 32 of this puck 50 is of the same width 37 as the tooth 32 shown in FIGS. 5-6. However, the outer surface 34 of the puck 50 is substantially flat instead of curved as shown in FIGS. 5-6. The square-shaped puck 50 would adequately function for the purposes described herein including to hold a bracket 15 tightly to a panel 1. However, a square-shaped puck 50 includes sharp edges and corners, which features are not as desirable as those of a circular or ovoid puck 12. According to an alternative implementation, a puck profile instead is hexagonal, octagonal, semi-circular, or other shape. A different shape may confirm to and communicate a different size of passage 13, or other aspect of the puck 12.

Figure 8:
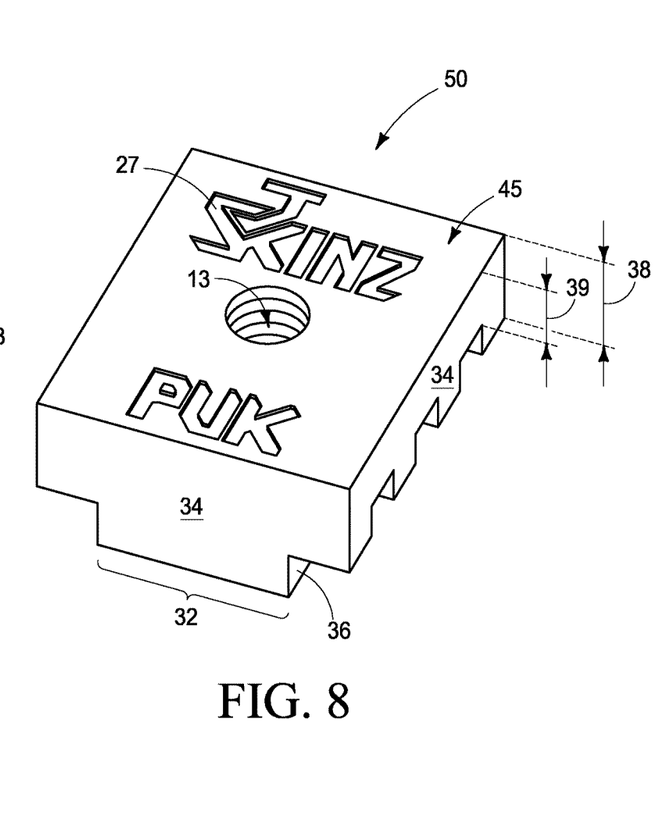
FIG. 8 is a bottom perspective view of the puck shown in FIG. 7.

FIG. 8 is a bottom perspective view of the puck shown in FIG. 7. A bottom surface 45 is visible and includes a logo 27. A passage 13 to accept a bolt (not shown) is visible and passes vertically through the tooth 32. The outer surface 34 is flat along the four sides. The tooth side wall 36 is partially visible.

Figure 9:
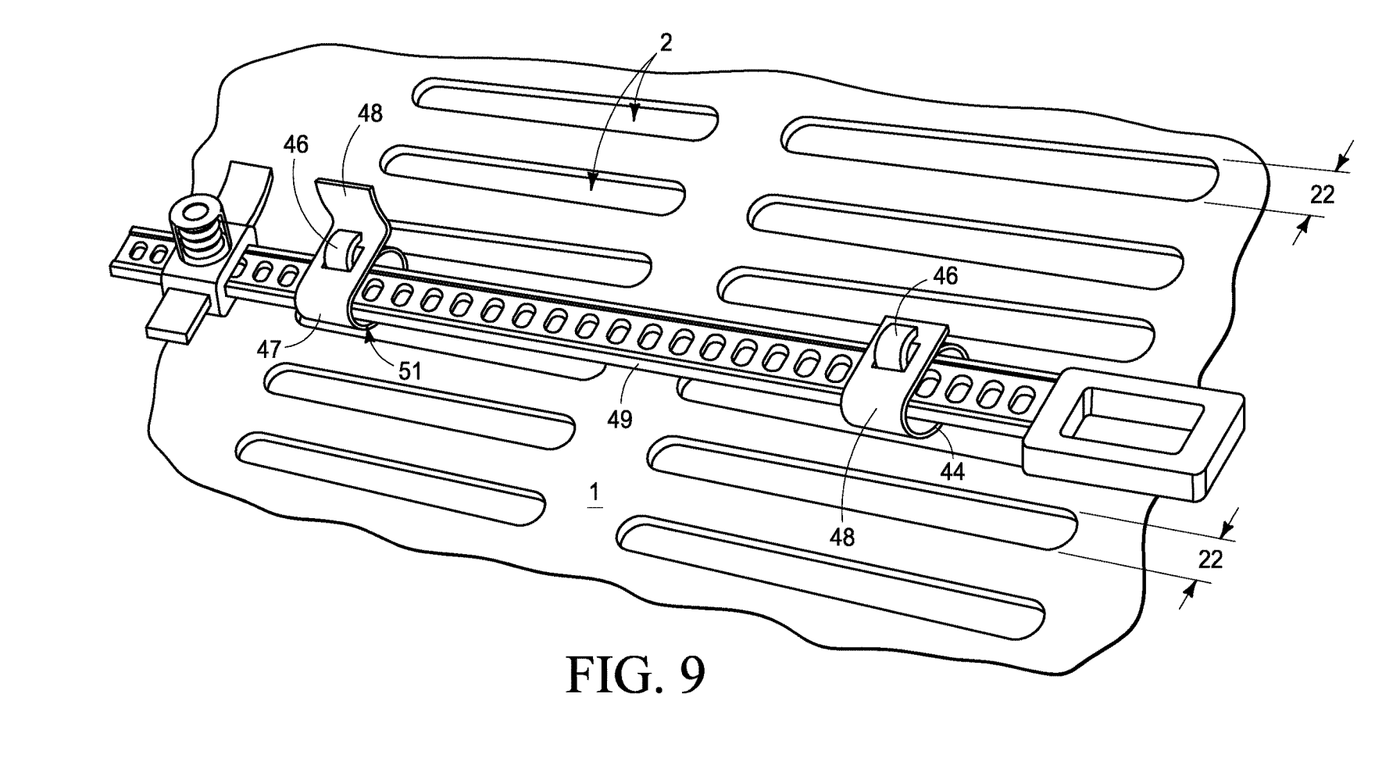
FIG. 9 is a partial perspective view of a panel shown in FIGS. 1-4 to which is secured a piece of heavy equipment.

FIG. 9 is a partial perspective view of a rack or panel 1 shown in FIGS. 1-4 to which is secured a piece of heavy equipment. With reference to FIG. 9, two series of slots 2 are visible. Each slot 2 is of uniform width 22. A heavy piece of equipment 49 is held by two heavy brackets 51. The heavy brackets 51 are designed for relatively large or heavy items. Although not visible in this figure, pucks secure the heavy brackets 51 to the panel 1. Each of the heavy brackets 51 includes a bracket base 47 and a bracket hook 46 over which is looped a flexible or elastic belt 48. The elastic belt or handle 48 is designed to stretch and spring into position over the hook 46. The bracket base 47 may be formed with a hook or ledge along its bottom edge so as to vertically bear the weight of the heavy piece of equipment 49. The elastic belt 48 may then only need to prevent the heavy piece of equipment 49 from rolling off of the heavy bracket 51. The heavy bracket 51 is a second embodiment and second example of a bracket. The heavy bracket 51 further illustrates that a variety of types of brackets and attachments may be made via use of the pucks 12 and the panels 1.

Conclusion

In the previous description, for purposes of explanation, numerous specific details are set forth in order to provide an understanding of the invention. It will be apparent, however, to one skilled in the art that the invention can be practiced without these specific details. In other instances, structures, devices, systems and methods are shown only in block diagram form in order to avoid obscuring the invention.

Reference in this specification to "one embodiment", "an embodiment", or "implementation" means that a particular feature, structure, or characteristic described in connection with the embodiment or implementation is included in at least one embodiment or implementation of the invention. Appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It will be evident that the various modification and changes can be made to these embodiments without departing from the broader spirit of the description. In this technology, advancements are frequent and further advancements are not easily foreseen. The disclosed embodiments may be readily modifiable in arrangement and detail as facilitated by enabling technological advancements without departing from the principles of the present disclosure.

I claim:

1. A mounting system for securing objects in a vehicle, the mounting system comprising:
a substantially planar panel made of a rigid or semi-rigid material, wherein the panel has formed therein a first set of slots, each slot of a uniform width, wherein the panel includes a first side and a second side, and wherein the panel is mountable to a portion of the vehicle;
a first puck having a head portion and a tooth portion, wherein the head portion has an outer dimension greater than the uniform width of the slots, wherein the head portion of the first puck includes at least two shoulders and the tooth portion extending from the head portion, wherein the first puck is assemblable to the panel in a slot from the first side of the panel, wherein the tooth has a first substantially planar side that mates to a first surface of the slot and a second substantially planar side that mates to a second surface of the slot when the first puck is assembled to the panel, wherein the tooth has a width from the first planar side to the second planar side where the width matches the uniform width of the slots of the first set of slots, wherein the tooth has a height running along an axis parallel to a slot, the height of the tooth being greater than the width of the slot, and wherein at least a portion of a third side of the tooth portion of the first puck is curved in shape to match semi-circular shape of the ends of each slot; and
a first bracket mountable to a distal end of the tooth portion of the first puck from the second side of the panel, wherein the first bracket, when assembled to the first puck, causes each shoulder of the first puck to press against the first side of the panel.

2. The mounting system of claim 1, wherein ends of each slot are semi-circular in shape.

3. The mounting system of claim 1, wherein the head portion of the first puck has a substantially uniform circular shape.

4. The mounting system of claim 1, wherein the first puck is made from a synthetic material, wherein the synthetic material includes a substantially uniformly distributed pigment, wherein a top surface of the first puck is planar and includes a human readable indication of size corresponding to the width of the slots.

5. The mounting system of claim 4, wherein the panel has further formed therein a second set of slots of a second uniform width distinct from the uniform width of the first set of slots; and wherein the mounting system further comprises:
a second puck having an outer dimension greater than the uniform width of the slots of the second set of slots, and wherein the second puck includes a head portion and a tooth portion, the head portion including at least two shoulders, wherein the tooth has a width matching the uniform width of the slots of the second set, and wherein the second puck includes a substantially uniformly distributed pigment that is distinct from the pigment of the first puck; and
a second bracket mountable to the second puck from the second side of the panel, and wherein the second bracket, when assembled to a distal end of the tooth portion of the second puck, causes each shoulder of the second puck to press against the first side of the panel.

6. The mounting system of claim 1, and wherein the first surface and the second surface of each slot of the first set of slots are perpendicular to the outer surface of the panel, and wherein the first side and the second side of the tooth portion are perpendicular to the head portion of the first puck.

7. The mounting system of claim 1, and wherein each slot of the first set of slots are substantially parallel with one another.

8. The mounting system of claim 1, further comprising a second set of slots, wherein each slot of the second set of slots is shorter in length than any of the slots of the first set of slots, and wherein each slot of the second set of slots are substantially parallel with one another.

9. The mounting system of claim 1, wherein the panel includes a contoured edge that matches a contour of a portion of the vehicle, and wherein the panel further includes a straight edge along another edge of the panel.

10. The mounting system of claim 1, wherein the first puck is formed with a passage through the tooth portion, the passage having female threads formed therein from a first side to a second side of the first puck, wherein the first bracket includes a bolt, wherein the bolt includes a proximal end and a distal end, wherein the distal end of the bolt is threaded, wherein when the first bracket is mounted to the first puck the bolt is threaded into the passage having female threads, and wherein a surface of each shoulder is crenelated.

11. The mounting system of claim 1, wherein a distal outer edge of the tooth is chamfered.

12. The mounting system of claim 1, wherein the height of the tooth portion is a same size as the outer dimension of the head portion of the puck.

13. A system for securing objects, the system comprising:
  a panel made of a rigid or semi-rigid material, and wherein the panel includes a first side and a second side, wherein the panel has formed therein slots of a uniform width, and wherein an inner end surface of each slot is curved;
  a puck having an outer dimension greater than the uniform width of the slots, wherein the puck includes a head portion, the head portion including at least two shoulders for overlying a portion of the panel bordering a slot, and a tooth portion having a width matching the uniform width of the slots, wherein the tooth portion has a height running along an axis parallel to a slot, the height of the tooth portion being greater than the width of the slot, wherein at least a portion of a side surface of the tooth portion of the puck is curved in shape to match the inner end surface of the slots, wherein the puck is formed with a passage therethrough, wherein the puck may be mated to the panel in one of the slots by inserting the tooth portion into the slot from the first side of the panel; and
  a bracket having a threaded bolt portion that is threaded into the passage of the puck and is mated to the puck from the second side of the panel, the puck mated to the panel from the first side of the panel, wherein the bracket, when assembled to the puck, causes each shoulder of the puck to press against the first side of the panel.

14. The system of claim 13, wherein the material of the panel is a synthetic material, and wherein the puck is formed of a plastic material.

15. The system of claim 13, wherein the system includes a threaded washer, wherein a distal end of the bolt is threaded through and secures the threaded washer to a back side of the puck when the bracket is mated to the puck.

16. The system of claim 13, and wherein the puck is substantially rectangular in outer profile.

17. The mounting system of claim 13, wherein the working surfaces of each slot are perpendicular to the first side and to the second side of the panel.

18. The mounting system of claim 13, wherein a portion of the puck is crenelated.

19. The mounting system of claim 13, wherein a top surface of the puck is planar and parallel to the panel when the puck is mated in a slot of the panel.

* * * * *